PORTABLE SHELTER WITH PANEL STORAGE FLOOR MEMBERS

Filed Sept. 14, 1964 7 Sheets-Sheet 1

INVENTORS.
KENNETH D. LOVE,
WESLEY E. LERDON,
DONALD J. BEHNK.
BY Stanley J Price
their
ATTORNEY INVENTORS
KENNETH D. LOVE,
WESLEY E. LERDON,
DONALD J. BEHNK
BY Stanley J Price, Jr.
their ATTORNEY.

PORTABLE SHELTER WITH PANEL STORAGE FLOOR MEMBERS

Filed Sept. 14, 1964 7 Sheets-Sheet 3

INVENTORS
KENNETH D. LOVE,
WESLEY E. LERDON,
DONALD J. BEHNK.
BY Stanley J Price,
their ATTORNEY INVENTORS.
KENNETH D. LOVE,
WESLEY E. LERDON,
DONALD J. BEHNK.
BY Stanley J. Pinch
their ATTORNEY.

INVENTORS.
KENNETH D. LOVE,
WESLEY E. LERDON,
DONALD J. BEHNK.
BY Stanley J Pruel
their ATTORNEY.

PORTABLE SHELTER WITH PANEL STORAGE FLOOR MEMBERS

Filed Sept. 14, 1964

INVENTORS
KENNETH D. LOVE,
WESLEY E. LERDON,
DONALD J. BEHNK.
BY. Stanley J Price Jr.
their
ATTORNEY.

PORTABLE SHELTER WITH PANEL STORAGE FLOOR MEMBERS

Filed Sept. 14, 1964

INVENTORS.
KENNETH D. LOVE,
WESLEY E. LERDON,
DONALD J. BEHNK
BY Stanley J. Price, Jr.
their
ATTORNEY.

United States Patent Office 3,330,081
Patented July 11, 1967

3,330,081

PORTABLE SHELTER WITH PANEL STORAGE FLOOR MEMBERS

Kenneth D. Love, Pittsburgh, Wesley E. Lerdon, Gibsonia, and Donald J. Behnk, Allison Park, Pa., assignors to Tasa Coal Company, Pittsburgh, Pa., a corporation of Pennsylvania Filed Sept. 14, 1964, Ser. No. 396,291
9 Claims. (Cl. 52—127)

This invention relates to a portable shelter and more particularly to a portable house-like shelter that can be readily assembled and disassembled.

There have been proposed in the past many types of portable shelters that are assembled with fastening means such as clasps, clips, pins or the like. The fastening means are separate and apart from the wall or roof panels and are usually employed to secure the panels to each other. Examples of portable shelters having this type of fastening means are illustrated in U.S. Patents 2,293,569 and 2,883,713. The use of such separate fastening means is attended with a number of disadvantages. In the first place, the separate fastening means are not fixedly secured to the panels and are easily lost or misplaced while the portable shelter is being dismantled and transported. The separate fastening means are usually specially shaped and fabricated for the particular shelter and without the special fabricated fastening means the shelter cannot be assembled. Another disadvantage of the separate fastening means is the manner in which the fastening means is secured to the panels during assembly to connect the panels to each other. The person assembling the shelter usually has a choice of positions for the fastening means and is unlikely to position the fastening means where the most satisfactory connection can be made. This results in an assembled shelter that does not have the desired rigidity and strength necessary for a structure of this type.

The separate fastening means are usually exposed and connected to the exterior portions of the portable shelter so that vandals can dismantle a portion of the shelter and gain access to the inside of the shelter. Also, with separate fastening means, a substantial time is required to properly assemble the portable shelter, and, with certain types of fasteners, several persons are usually required for proper assembly.

Various efforts have been made to eliminate the use of separate fasteners for portable shelters. For example, the lower panels on certain of the shelters are hingedly secured to the floor and hook and eye type fasteners are employed to connect certain of the panels to each other. The hinge and hook and eye type fasteners are exposed and are on the exterior portion of the shelter so that the shelter is not vandal-proof. Even with these improvements separate fasteners are still employed to connect certain panel portions of the shelter.

Briefly, this invention includes a portable shelter that has a multiple paneled floor section that supports a front wall, a rear wall and a pair of side walls. The front and rear walls are secured to the floor section by means of a key latch mechanism. The front and rear walls comprise three vertical panels that are secured to each other along their edge portions by means of the same type of key latch mechanism that secures the front and rear walls to the floor section. The key latch mechanisms securing the three vertical panels are locked in a latched position after the panels are in the assembled position. The key latch mechanism includes a slidable member that is moved longitudinally into a locked position by the rotation of a key member. The aperture for receiving the key member opens into the inner portion of the shelter so that the key latch mechanism cannot be unlocked from the exterior portion of the shelter. The side walls have three panels that are secured to the front and rear wall end panels by means of sliding latch mechanisms. The roof portion of the portable shelter comprises a pair of roof panels that are secured to the front and rear wall end panels by slidable latch mechanisms similar to the latch mechanisms that secure the side panels to the end walls. The pair of roof panels are secured to each other by means of key latch mechanisms similar to the key latch mechanisms that secure the front and rear walls to the floor section and the front and rear wall panels to each other. The assembled portable shelter provides a rigid weatherproof house-like shelter that is easily assembled, disassembled, and packaged for transportation and storage. The panels forming the front and rear walls, the side walls and the roof portion are conveniently stored in the floor section for transportation and storage. The fastening means for the herein described portable shelter includes latch means, both key actuated and sliding type, that are integral with and form a part of the various panels comprising the portable shelter. Latch mechanisms, other than the integral latch means are not required for the portable shelter. The integral latch mechanisms are so arranged on the panel members that the panel members are connected to each other to provide a rigid, strong portable shelter.

A primary object of this invention is to provide a portable shelter that is readily assembled and disassembled and does not require separate independent fastening means to secure the various panels in an assembled position.

Another object of this invention is to provide a portable shelter that has slidable latch means as an integral part of the shelter panels which secure the panels to each other during assembly of the shelter.

Another object of this invention is to provide key actuated fastening means for the panels of a portable shelter that are integral with the shelter panels and are not visible when assembled.

The method and apparatus which comprise this invention accomplish the foregoing and other functions in a novel way, as will now be explained. Further features, objects, and advantages will either be specifically pointed out or become apparent when, for a better understanding of the invention, reference is made to the following written description, taken in conjunction with the accompanying drawings which form a part hereof in which:

FIGURE 11 is taken along the line 11—11 in FIGURE 7.

Figure 1:
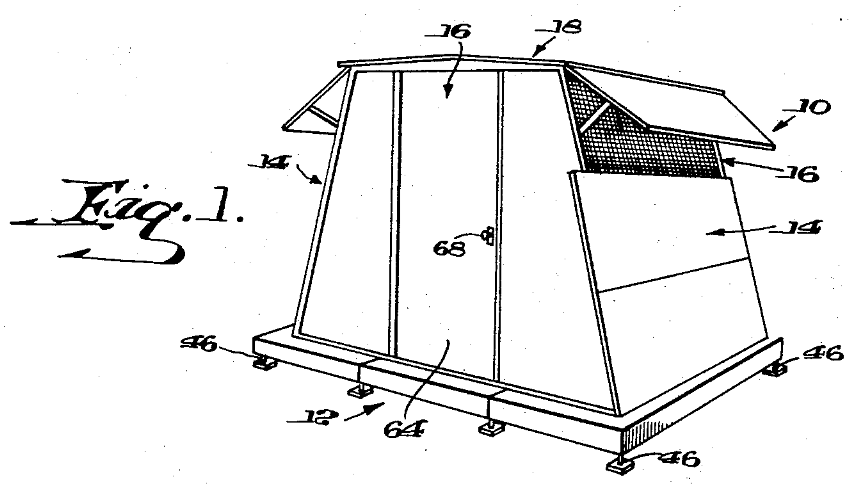
FIGURE 1 is a perspective view of the assembled portable shelter.

Referring to the drawings and particularly to FIGURE 1, the improved portable shelter generally designated by the numeral 10 has a floor portion generally designated 12, a pair of side walls 14 and a pair of end walls 16. A roof portion generally designated 18 is secured to the upper portion of the end walls 16 and in overlying relation with the upper edge portions of the side walls 14 to form a house-like enclosure 10.

Figures 3, 4:
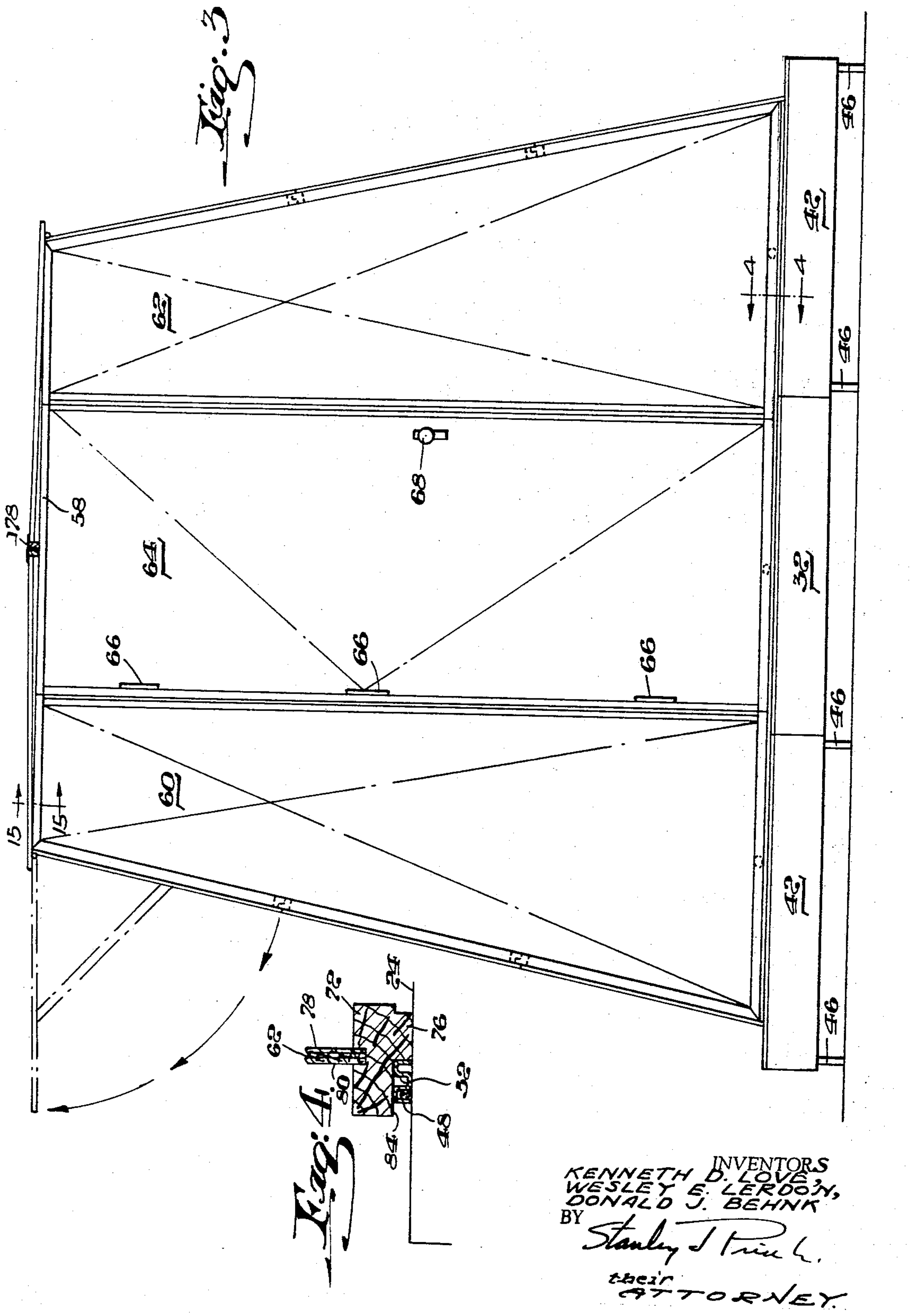
FIGURE 3 is a view in front elevation illustrating the assembled front wall of the portable shelter.
FIGURE 4 is a fragmentary view in section taken along the line 4—4 of FIGURE 3 and illustrating the manner in which the front wall panel portions abut the panel key strip secured to the shelter floor.
Figures 5, 6:
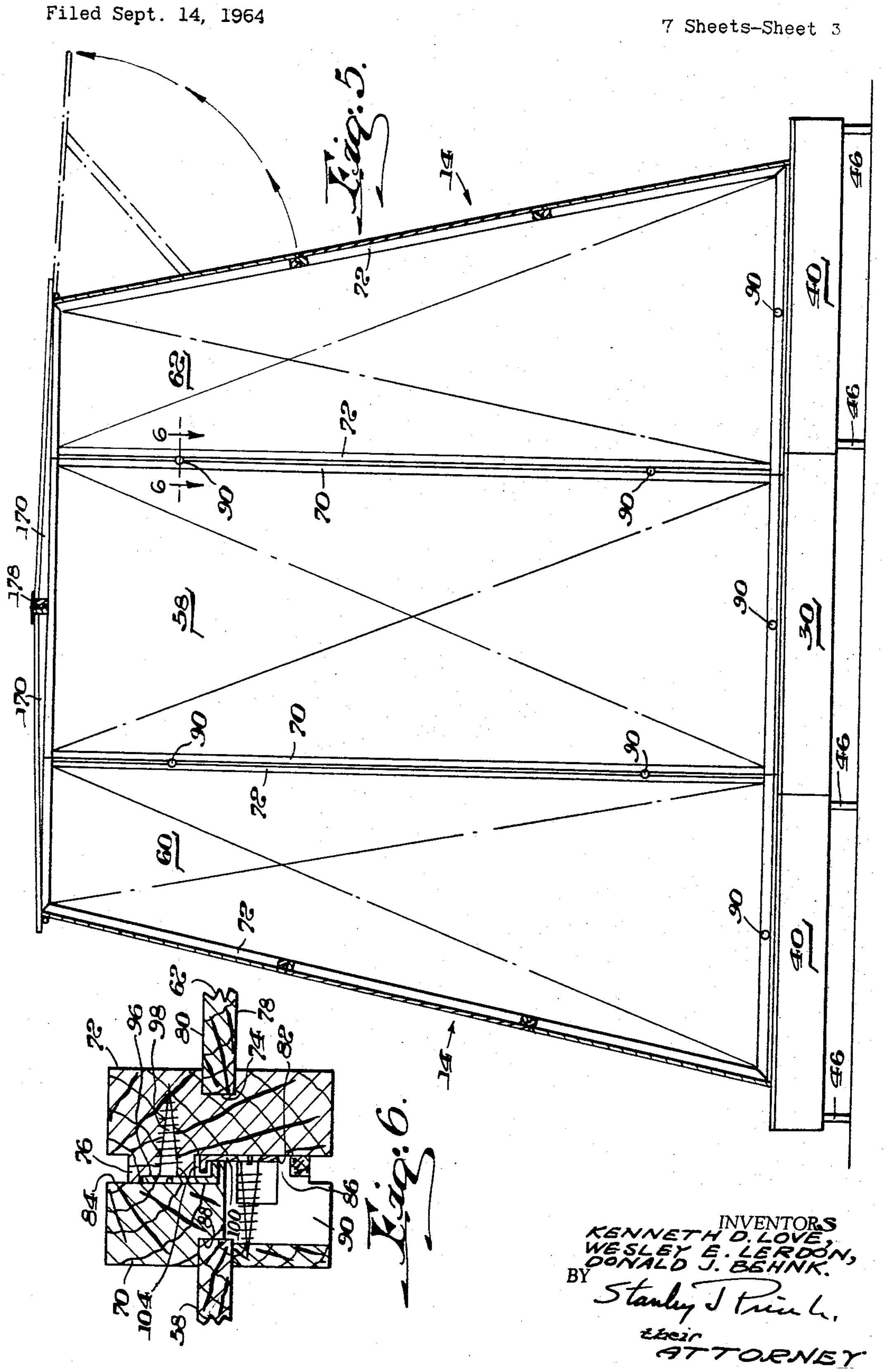
FIGURE 5 is a view in elevation similar to FIGURE 3 illustrating the interior side of the rear wall with the side wall panels secured thereto.
FIGURE 6 is a view in section taken along the line 6—6 of FIGURE 5 illustrating the manner in which the rear wall vertical panels are secured to each other by means of the key latch mechanism.
Figure 7:
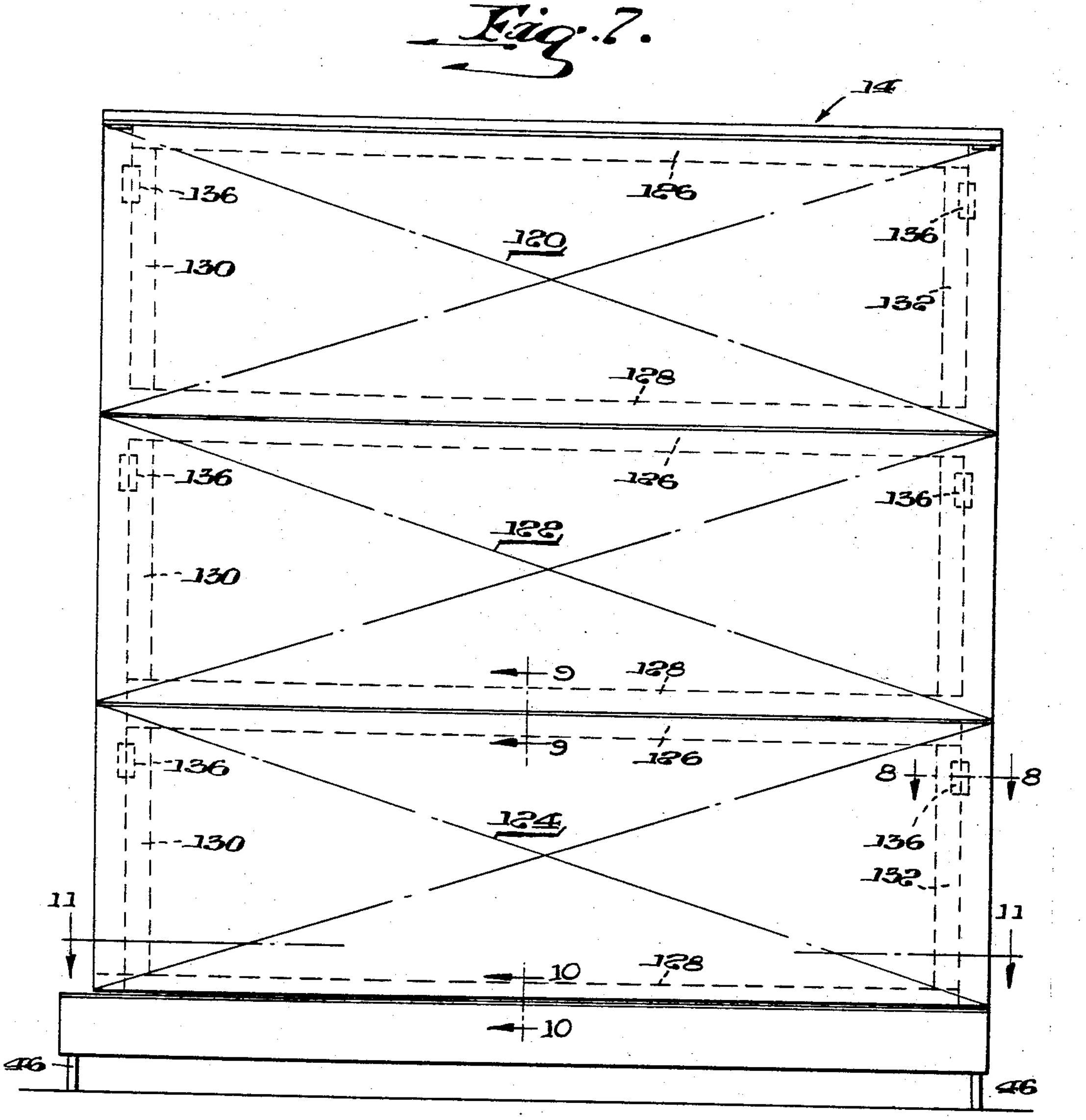
FIGURE 7 is a view in side elevation of the portable shelter side wall.
Figures 11, 12:
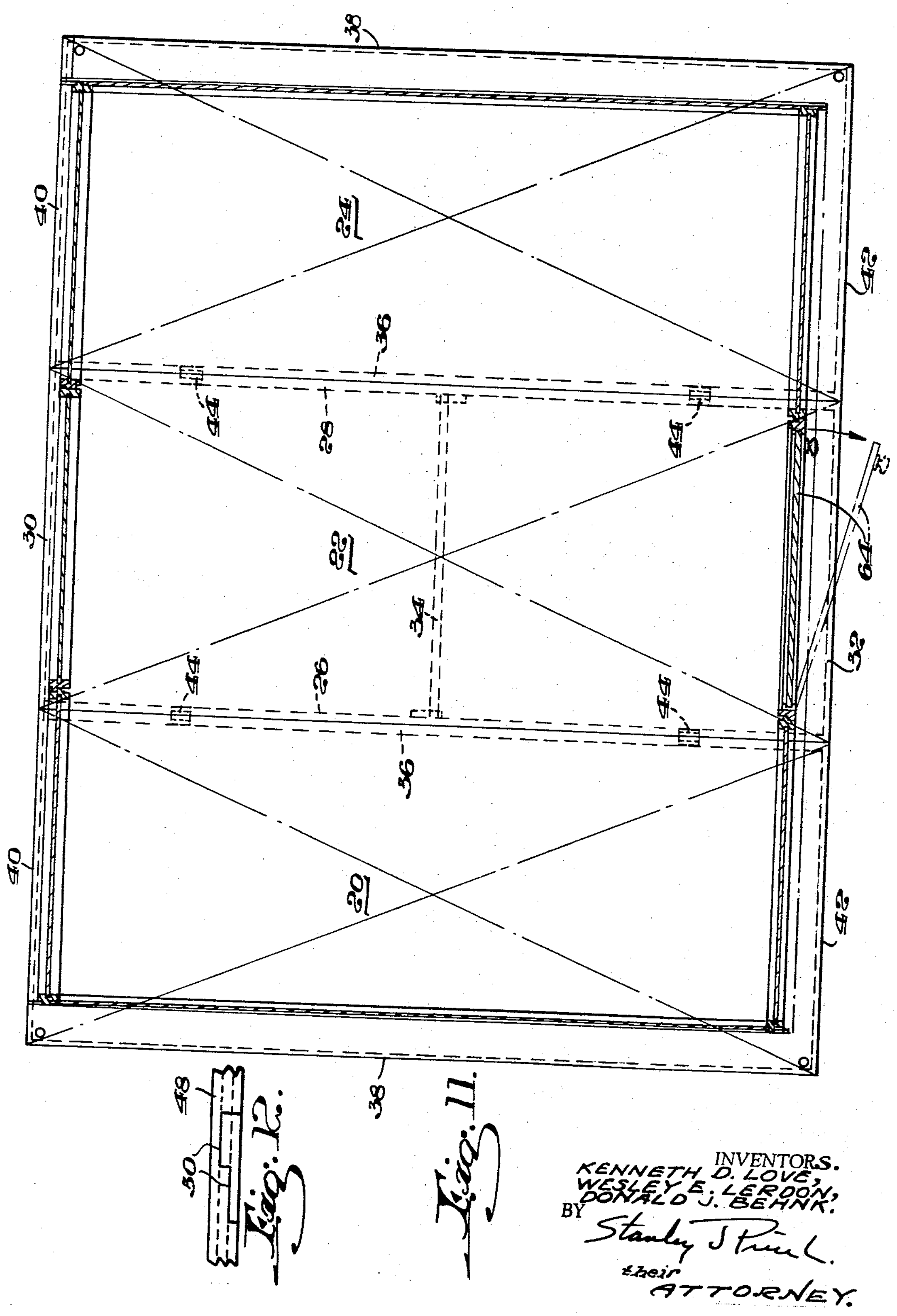
FIGURE 11 is a top plan view of the floor portion with the end walls and side walls positioned thereon.
FIGURE 12 is a fragmentary view in elevation of the key strip that is secured to the floor portion and supports the end walls and side walls.

The floor portion 12 is illustrated in side elevation in FIGURES 3, 5, and 7 and in top plan view in FIGURE 11. The floor portion 12 includes three sections 20, 22 and 24. The center section 22 has a panel portion with a pair of depending longitudinal side walls 26 and 28 and a pair of depending end walls 30 and 32 which form a box-like receiver to be later described. A lateral center support 34 is suitably positioned beneath the panel portion to provide rigidity thereto.

Figures 2, 18:
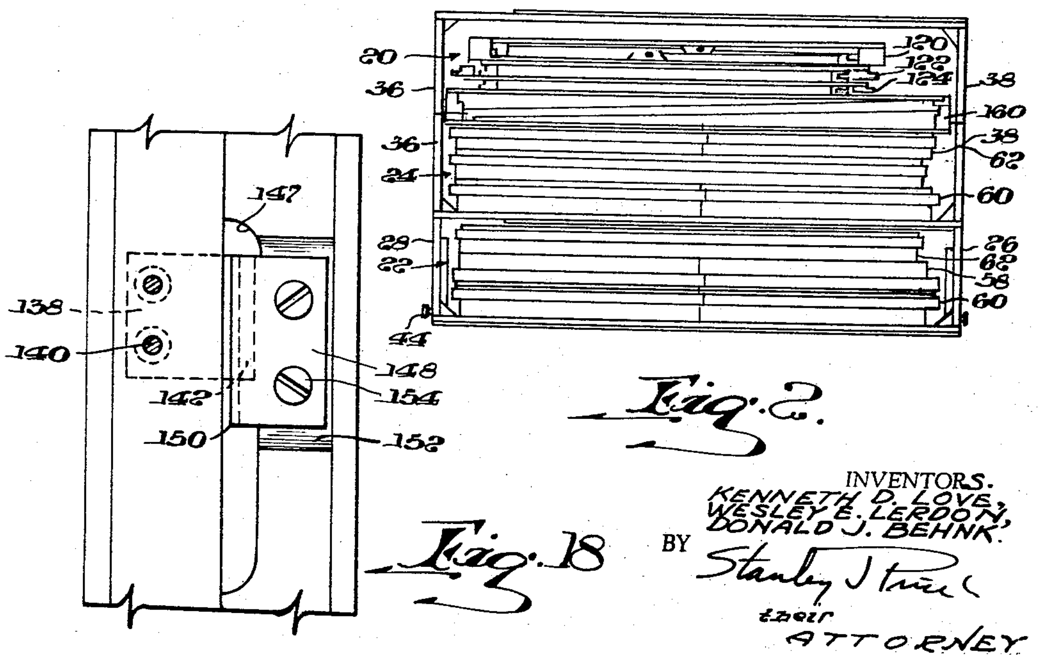
FIGURE 2 is a view of the portable shelter in a disassembled condition stored in the floor sections.
FIGURE 18 is a fragmentary top plan view of the sliding latch mechanism illustrated in FIGURE 17.

The floor end sections 20 and 24 are similar in construction and have panel portions with depending longitudinal side members 36 and 38 secured thereto. The end sections 20 and 24 have depending end portions 40 and 42 which also form box-like frame members for receiving other portions of the portable shelter as will be later described. The end sections 20 and 24 are secured to the intermediate section 22 by hook-like fasteners schematically designated 44. Portions of the hook-like fasteners are integral with the longitudinal side members 26, 28, and 36 to provide a fastening means for the floor sections to each other. A portion of the hook-like fastener is illustrated in FIGURE 2 and designated by the numeral 44.

As is illustrated in FIGURES 1, 3, 5, and 7, the floor end sections 20 and 24 have a plurality of leveling devices 46 secured thereto. The leveling devices 46 are preferably adjustable relative to the sections 20 and 24 to provide a uniform horizontal floor surface for the shelter 10. A key strip illustrated in FIGURES 4, 10, and 11 extends around the floor 12 adjacent the periphery and is secured to the upper surface of the floor sections 20, 22, and 24 by means of nails, wood screws, or the like. The key strip 48 is formed in sections so that the floor sections 20, 22, and 24 are separable from each other and when assembled the key strip 48 has a continuous frame-like arrangement forming parallel spaced upstanding supports on the top surface of the floor 12. The key strip 48 has a plurality of horizontal slotted portions 50 as illustrated in FIGURE 12 to receive the key actuated portion of the key actuated latch mechanism (later described). The key latch mechanisms fixedly secure the front and rear walls 16 to the key strip 48. The key strip illustrated in section in FIGURES 4 and 10 has an intermediate upwardly opening groove which receives a portion of the side wall therein and a pair of downwardly extending grooves 54, one of which receives a flexible weather-stripping material 56 to provide a weather-tight seal between the floor 12 and the walls 14 and 16.

The shelter 10 has a pair of end walls 16 illustrated in detail in FIGURES 3 and 5. The exterior side of the front end wall is illustrated in FIGURE 3 and the interior side of the rear end wall is illustrated in FIGURE 5. The front and rear end walls are similar in construction and have a center panel 58 and a pair of end panels 60 and 62. The end panels 60 and 62 of both the front and rear end walls are of the same construction. The intermediate panel 58 in the rear end wall is a solid panel. If desired, an optional window panel can be used in place of the solid rear wall intermediate panel 58. The intermediate panel 58 in the front end wall is frame-like in construction and includes a door panel 64 that is hingedly connected to the frame portion of panel 58 by means of hinges 66. A suitable knob and lock mechanism 68 is provided for the door 64.

Figure 8:
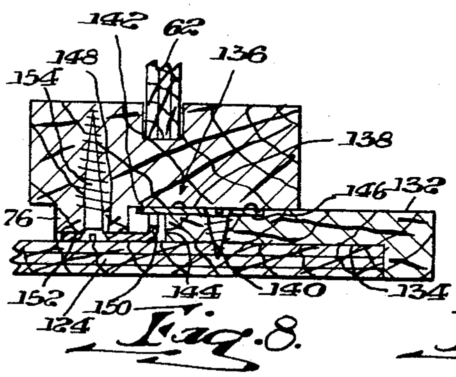
FIGURE 8 is a fragmentary view in section taken along the line 8—8 and illustrating the manner in which the side wall panels are secured to the end wall panels by means of a sliding latch mechanism.

The intermediate panel 58 has a peripheral frame 70 that is secured to the panel 58 in the manner illustrated in FIGURE 6 and has the configuration in section illustrated in FIGURES 4, 6, 8, and 15. The vertical frame members 70 on opposite sides of the panel 58 are reversed to provide for proper mating with the peripheral frames 72 that are secured to the end portions of the end panels 60 and 62. The portion of the frame 70 illustrated in FIGURE 6 has a section removed therefrom for the key actuated latch mechanism. In cross section, however, the peripheral frame 70 has substantially the same shape as the peripheral frame 72 illustrated in FIGURE 6. FIGURE 8 illustrates in section a portion of the peripheral frame 72 that abuts the side wall members and illustrates the common shape of the peripheral frame.

The peripheral frame 72 illustrated in FIGURE 6 will now be described in detail. The panel 62 is secured in a longitudinal slot 74 by any suitable means such as glue or the like with the interior and exterior surfaces 78 and 80 facing in the direction indicated. The frame 72 has a longitudinal rectangular protuberance 76 extending forwardly from the surface 82. The proturberance 76 is arranged to abut an exterior surface 84 on the frame 70. The frame 70 has a similar protuberance 86 that abuts the exterior surface 82 of frame 72. The intermediate panel 58 is secured in a longitudinal groove 88 in frame 70 in a manner similar to the panel 62. Thus, when the end panels 60 and 62 are in abutting relation with the intermediate panel 58, the frames 70 and 72 are in abutting relation with each other with the longitudinal protuberance 76 and 86 abutting the respective exterior surfaces 82 and 84 of the respective frame 72 and 70. The protuberances have longitudinal shoulder portions that abut each other and provide a unitary rigid member comprising frames 70 and 72. The frame members 72 have a lateral bore 90 and a key actuator 92 extends to actuate the key latch for securing the panels 60 and 62 to the intermediate panel 58. The frames 70 and 72 have other lateral bores adjacent the lower portions of panels 58, 60, and 62 through which the key actuated mechanisms 94 are actuated to secure the panels 58, 60, and 62 in the slotted portion 50 of the key strip 48 as illustrated in FIGURE 12.

FIGURE 4 illustrates the manner in which panel 62 abuts the key strip 48. The frame protuberance 76 rests on the upper surface of the floor panel 24 and has its shoulder portion abutting the key strip 48. The vertical dimension of the key strip 48 is such that the exterior surface 82 of frame 72 rests on the upper portion of the key strip 48. The frame 72 is secured to the key strip 48 by the key actuated latch mechanism which will now be described.

Figure 20:
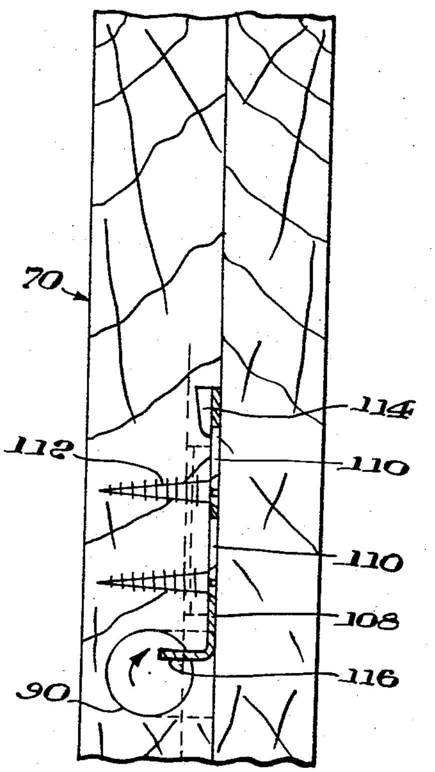
FIGURE 20 is a sectional side view of the key latch mechanism illustrated in FIGURE 19.
Figure 19:
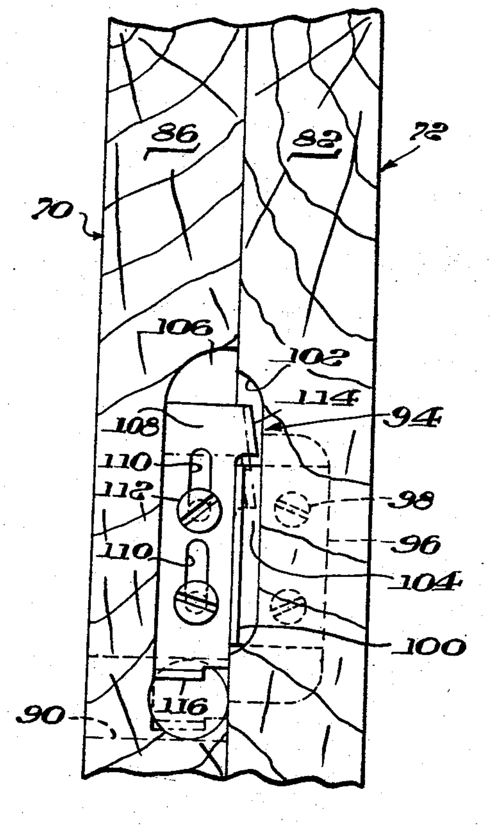
FIGURE 19 is a sectional plan view of the key latch mechanism.
Figure 21:
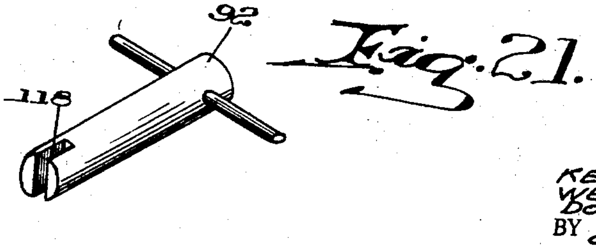
FIGURE 21 is a view in perspective of a typical slotted key tool employed to actuate the key latch mechanism to connect the panels to each other.

Referring to FIGURES 6, 19, and 20, the key actuated patch mechanism generally designated 94 is illustrated in detail and includes a fixed member 96 that is secured to a protuberance of one of the frame members by means of screws 98. The fixed member has a flange side portion 100, which is facing upwardly in FIGURE 19, and the proturbance has a lateral cutaway portion 102 that provides a passageway 104 between the flange portion 100 and the shoulder of the protuberance. The protuberance on the other frame member has a recessed portion 106 in which there is slidably positioned a key actuated latch 108. The key actuated latch has a pair of elongated slots 110 therein through which screws 112 extend and slidably secure the latch 108 in the recessed portion 106. The key actuated latch 108 has a lateral downturned flanged portion 114 adjacent one edge that is arranged to move in passageway 104 beneath the upturned portion 100 of fixed member 96 to latch the frames 70 and 72 to each other. The key actuated latch member 108 has a downturned transverse end flange 116 which extends into the lateral bore 90 formed in the frame member 70. The key actuator 92 has a slotted end portion 118 that fits over the end flange 116 of key actuated latch 108. When positioned in the bore 90 rotation of the key actuator 92 in one direction moves the key actuated latch 108 as indicated in FIGURE 19 in dotted lines and positions the downturned flange 114 in passageway 102 beneath the upturned flange 100 of fixed member 96 to lock the frames 70 and 72 to each other. To unlock frames 70 and 72 the key actuator 92 is rotated in the opposite direction to move the lateral downturned flange 114 in passageway 104 to the position indicated in full lines in FIGURE 19.

The slotted portions 50 in the key strip 48 serve a similar function as the fixed portions 96 of key latch 94 to provide a similar receiver for the flange 114, and secure the lower portion of the end wall panels 58, 60, and 62 to the floor 12.

Figure 17:
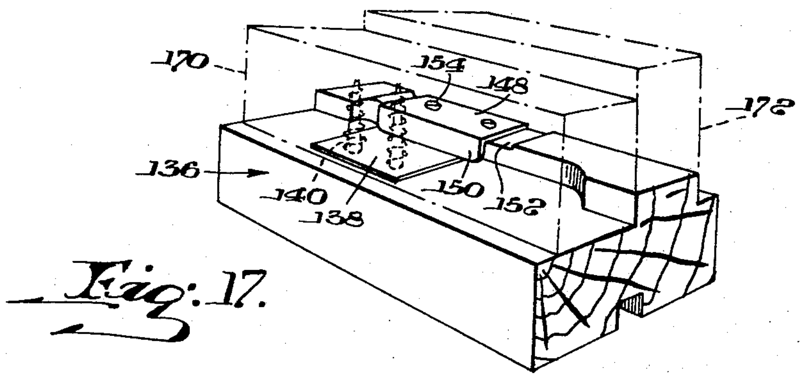
FIGURE 17 is a fragmentary view in perspective of the sliding latch member employed to secure the side wall panels and roof panels to the end walls.

The side walls 14 have three elongated rectangular panels 120, 122, and 124. All of the panels 120, 122, and 124 have a peripheral frame member comprising a pair of horizontal side members 126 and 128 and a pair of vertical end members 130 and 132. All of the vertical end members 130 and 132 are of the same configuration (FIGURE 8) and include a recessed portion 134 that receives the respective panel. The end members 130 and 132 are arranged to abut the frame sections 72 of the respective end panels 60 and 62 with the protuberances 76 of frame 72 abutting the panel 124. The side wall panels 120, 122, and 124 are secured to the end wall frames 72 by a sliding latch mechanism generally designated by the numeral 136 that is illustrated in detail in FIGURES 8, 17, and 18.

The sliding latch mechanism 136 includes a plate 138 secured to the frame end member 132 by suitable securing means 140. An end portion 142 of plate 138 extends beyond the end wall 144 of frame 132. The plate 138 is preferably positioned in a recessed portion 146 of frame 132 so that the exterior surface of plate 138 is in the same plane as the adjacent surface of frame end member 132. Secured in a laterally recessed portion 147 to the protuberance 76 of side wall frame 72 is a latch 148 that has a downturned end portion 150. The latch 148 is secured in a receiving recess 152 in protuberance 76 by screws 154. The lower edge of latch end portion 150 is spaced from the surface 82 of frame 72 to permit the plate 138 to pass therebetween and latch a side wall panel to an end wall panel. Thus to secure the side wall panels 120, 122, and 124 to the end walls, the side wall panels are positioned with the plate 138 above the latch 148. The side wall panels are then moved downwardly until the strap member 138 passes between the lower edge of downturned portion 150 and the surface 82 of frame 72 to thereby secure the side wall panels to the end walls.

Figure 9:
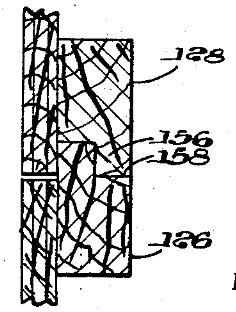
FIGURE 9 is a fragmentary view in section taken along the line 9—9 of FIGURE 7 illustrating the manner in which the side wall panels abut each other in an assembled position.
Figure 10:
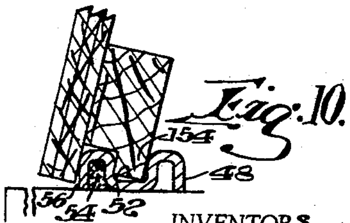
FIGURE 10 is a fragmentary view in section taken along the line 10—10 of FIGURE 7 illustrating the manner in which the lower most side wall panel is supported in the panel key strip secured to the shelter floor portion.

The lower horizontal side member 128 on the lower panel 124 has a configuration in cross section as illustrated in FIGURE 10. The member 128 has a longitudinal protuberance 154 that is positioned in the grove 52 of key strip 48 to fixedly position the lower side wall panel 124 relative to the floor panel 24. The lower horizontal side members 128 of panels 120 and 122 mate with the upper horizontal members 126 of panels 122 and 124 respectively as is illustrated in FIGURE 9. The longitudinal member 128 has a longitudinally extending flanged portion 156 that is positioned in a longitudinally extending receiving portion 158 of horizontal portion 126 to form a rigid connection between panels 120 and 122 and between panels 122 and 124. The horizontal side member 126 of top panel 120 is substantially rectangular in configuration and forms a support surface for the roof panels.

Figures 13, 14:
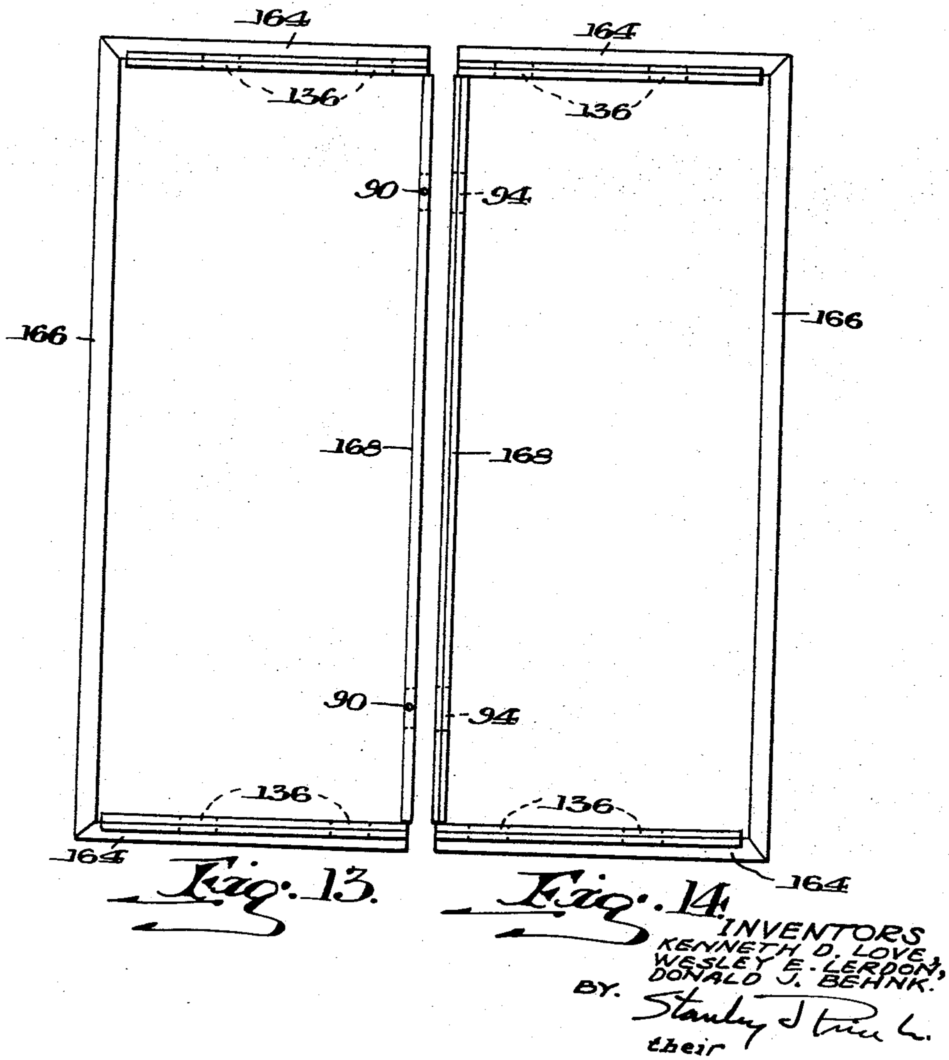
FIGURES 13 and 14 are plan views of the interior portion of the roof panels.

FIGURES 13 and 14 illustrate the roof panels 160 and 162 which have peripheral frame members therearound. The frame members include end members 164, exterior side member 166 and interior side members 168. The end members 166 are arranged to be supported by side frame members 126 of the upper side wall panels 120. The end members 164 are similar to the vertical frame members 132 associated with the side wall panels and are illustrated in section in FIGURE 15.

Figure 15:
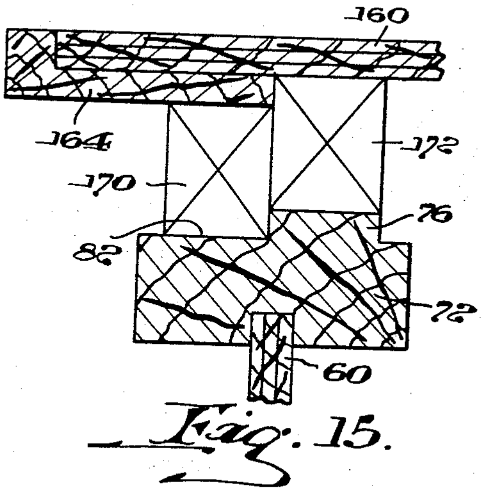
FIGURE 15 is a view in section taken along the line 15—15 in FIGURE 3 illustrating the manner in which the roof panel abuts the upper side of the end wall.

A pair of wedge panels 170 and 172 are generally rectangular in cross section and are secured to the frame member 164 and the panel 160 as illustrated in FIGURE 15 to provide a stepped configuration in section that abuts the protuberance 76 and the surface 82 of end wall frame member 72. The wedge panels have a wedge like shape in plan as illustrated in FIGURE 5 to provide the desired pitch for the roof panels.

Figure 16:
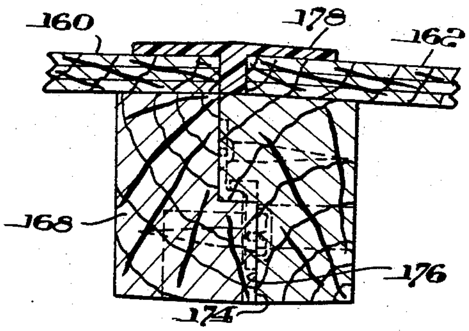
FIGURE 16 is a fragmentary view in section illustrating the manner in which the inner portions of the roof panels are secured to each other by the key latch mechanism.

Slidable latch mechanisms similar to the slidable latch mechanism 136 are associated with each of the wedge panels 170 and 172 and the end wall frame 72 to provide a sliding latch means to secure the roof panels 160 and 162 to the end walls 16. The sliding latch mechanisms 136 are diagrammatically illustrated in FIGURES 13 and 14 and the perspective view of the latch mechanism 136 in FIGURE 17 generally illustrates the wedge members 170 and 172 in phantom lines. The roof panels 160 and 162 have mating side members 168 that are illustrated in section in FIGURE 16. The members 168 are so shaped that one member has a laterally extending protuberance 174 that extends throughout the length of the member 168. The other member 168 has a mating longitudinal recess 176 in which the protuberance 174 is positioned when the roof panels 160 and 162 are in abutting relation with each other. Key actuated latch mechanisms similar to the key actuated mechanisms 94 are provided to secure the roof panels 160 and 162 to each other. They key actuated latch mechanisms 94 are illustrated diagrammatically in FIGURES 13 and 14 and a portion of the key actuated latch mechanism is illustrated in FIGURE 16. The side frame member 168 connected to roof panel 160 has bores 90 therethrough for the key actuator 92.

With this arrangement the roof panels 160 and 162 are secured to the end walls 16 by the sliding latch mechanisms 136 previously described and are secured to each other by the key actuated latch mechanisms 94. To position the roof panels 160 and 162 on the end walls 16, the roof panels 160 and 162 are moved laterally toward each other until the sliding latch mechanisms 136 engage the roof panels 160 and 162 to the end walls 16 and the roof panel side members 168 abut each other with the protuberance 174 positioned in the receiving recess 176. The latch mechanisms 94 are then actuated by the key actuator 92 to engage the panels 160 and 162 to each other. A T-shaped flashing is positioned between the ends of the roof panels 160 and 162 to provide a weather-tight connection. The roof panels 160 and 162 are the last panels secured to the portable structure during assembly and serve as a keystone to rigidly lock all of the panels to each other and provide a rigid house-like structure.

The various panels in a disassembled condition are arranged to be stored in the box-like flooring as is illustrated in FIGURE 2. The floor end sections 20 and 24 are positioned as illustrated in FIGURE 2 and with the depending longitudinal side walls 36 and 38 in abutting relation with each other to form a rectangular box-like structure. The floor end portions 20 and 24 are positioned over the floor center section 22 with the depending longitudinal side walls 26 and 28 aligned with the depending side walls 36 and 38 of the end sections 20 and 24. The rear end wall panels 60, 58, 62, are positioned within the flooring center section 22 and the front wall panels 60, 58, and 62 are similarly positioned within the floor end section 24. The pair of roof panels 160 and 162 and the side panels 120, 122, and 124 of both side walls 14 are positioned within the confines of the flooring end section 20. With this arrangement, panel portions of the portable shelter 10 are conveniently positioned within the confines of the box-like floor sections for storage and transportation. A flexible strap member may be employed to secure the floor sections in the position illustrated to provide a unitary package. The packaged structure has a vertical dimension of approximately 21" and a horizontal dimension of approximately 36".

The portable shelter 10 is assembled in the following manner. The flooring end sections 20 and 24 are secured to the floor center section 22 by means of the hook-like fasteners 44 as illustrated in FIGURE 11. One of the end panels as, for example panel 62, is positioned with the lower frame 72 abutting the key strip 48 as illustrated in FIGURE 4. The key actuated latch mechanism 94 is actuated to secure the end wall panel 62 to the floor 12. A lower side panel 124 is then secured to the vertically positioned end wall and panel 62 by means of the latch mechanism 136. The other end wall end panel 62 is then secured to the floor 12 by the key actuated latch mechanism 94 and the other end of the lower side wall panel 94 is secured to the end wall end panel 62 by the sliding latch mechanism 136. The side wall 124 has its lower portion positioned in key strip 48 as is illustrated in FIGURE 10. The other side wall panels 120 and 122 are thereafter secured to the end wall end panels 62 by the sliding latch mechanisms 136. The end wall center panels 58 are then secured to the end panels 62 by the key actuated latch mechanisms 94 as previously described. The center end panels 58 are also secured to the key strip 48 by the key actuated latch mechanism as previously described.

The other end wall panels 60 are then secured to the center panels 58 by the key actuated latch mechanism and also secured to the floor 12 by the same type of key actuated latch mechanisms. The other side wall 14 is secured to the end wall end panels 60 in the manner similar to the previously described other side wall. After the end walls 16 and the side walls 14 have been assembled the roof panels 160 and 162 are positioned on the upper edges of the end walls 16. The roof panels 160 and 162 are secured to the upper edges of the end walls 16 by means of the sliding latch mechanisms 136. The sliding latch mechanisms are engaged when the roof panels 160 and 162 are slidingly moved toward each other. In an engaged position, the members 168 of both panels 160 and 162 abut each other and are fastened to each other by the key actuated latch mechanisms 94. The flashing 178 is then positioned between the roof panels 160 and 162 to provide a weather-tight roof 18.

Although not described in detail, there is provided a hinge mechanism for the top side panels 120 so that the panels may be pivoted outwardly as is illustrated in FIGURES 1 and 5 and form windows for the portable shelter 10. Other modifications in the panel structure to provide additional ventilation may be provided without departing from the invention herein described.

It will be apparent from the above description that the portable shelter 10 may be assembled and disassembled without the use of a separate and independent fastening means. The fastening means, both the sliding latch mechanisms 136 and the key actuated latch mechanisms 94, are integral with the panel portions of the shelter 10 and are arranged so that they are enclosed when the shelter is assembled and the bores 90 for the key actuator 92 extend inwardly into the portable shelter, thus providing a vandal-proof structure.

According to the provisions of the patent statutes, we have explained the principle, preferred construction, and mode of operation of our invention and have illustrated and described what we now consider to represent its best embodiments. However, we desire to have it understood that, within the scope of the appended claims, the invention may be practiced otherwise than as specifically illustrated and described.

We claim:

1. In a portable shelter the combination comprising,
a pair of end walls arranged in parallel spaced relation to each other,
a pair of side walls secured to the vertical edges of said end walls,
said end walls having upper edge portions with roof panel engaging means formed thereon,
a pair of roof panels having lateral frame portions in overlying relation with both of said end wall upper edge portions,
said lateral frame portions having latch means fixedly secured thereto and arranged to engage said roof panel engaging means to secure said roof panels to both of said end wall upper edge portions,
said roof panels having longitudinal frame portions arranged to abut each other in a roof assembled position,
means to secure said roof panel longitudinal frame portions to each other to thereby maintain said portable shelter in an assembled position, and
a floor member having a plurality of floor panels with depending side and end portions forming a box configuration, said floor member arranged to support said end walls and said side walls in an assembled condition, said floor panels arranged to receive said end walls, said side walls and said roof panels in a dismantled condition.

2. A portable shelter as set forth in claim 1 in which said end wall side edge portions include side wall panel engaging means,
said side walls having a plurality of panels arranged in overlying relation with said end wall side edge portions, and
said side wall panels having latch means fixedly secured thereto and arranged to engage said side wall panel engaging means to secure said side wall panels to said end wall side edge portions.

3. A portable shelter as set forth in claim 1 in which said end walls each include a plurality of end wall panels having vertical frame portions arranged to abut each other in an assembled position, and
means to secure said end wall panel vertical frame portions to each other to thereby form a unitary end wall.

4. A portable shelter as set forth in claim 1 in which said roof panel lateral frame portions include lateral recessed portions,
said latch means including a latch member fixedly secured to said lateral frame portion and extending laterally into said lateral recessed portion,
said roof panel engaging means including a plate member secured to said roof panel and arranged to be slidingly positioned between said latch member and said lateral frame portion to thereby secure said roof panel to said end wall upper edge portion.

5. A portable shelter as set forth in claim 1 in which said means to secure said roof panel longitudinal frame portions to each other includes a lateral recessed portion in one of said roof panel longitudinal frame portions forming a receiver for a latch member, a movable latch member secured to the other of said roof panel longitudinal frame portions and arranged to be positioned adjacent said receiver, and means to move said latch member relative to said other roof panel longitudinal frame portion into said receiver to thereby secure said roof panel longitudinal frame portions to each other.

6. In a portable shelter the combination comprising, a floor member having a pair of parallel spaced upstanding supports, said upstanding supports having latch receiver portions formed therein, a pair of end walls arranged in spaced parallel relation and having lower horizontal edge portions abutting said spaced upstanding supports, said end wall lower horizontal edge portions having movable key actuated latch members extending laterally therefrom, said movable key actuated latch members operable upon actuation to engage said latch receiver portions on said upstanding supports and secure said pair of end walls to said floor member, said end walls having side edge portions with latch receiver portions formed therein, a plurality of side wall panels having fixed latch members extending inwardly from the interior surface thereto, said plurality of side wall panels positioned with said interior surface abutting said end wall and said fixed latch mechanism in overlying relation with said end wall latch receiver portions, said side wall panels arranged upon downward sliding movement to engage said fixed latch members secured thereto to said end wall latch receiver portions to form a pair of side walls secured to said end wall side edge portions, said end walls having top edge portions with latch receiver portions formed therein, a pair of roof panels having fixed latch members extending inwardly from the interior surface thereof adjacent the side edge portions, said roof panels each having an inwardly extending longitudinal frame portion adjacent one longitudinal edge, one of said roof panel longitudinal frame portions having latch receiver portions therein, the other of said roof panel longitudinal frame portions having movable key actuated latch members extending therefrom, said roof panels positioned with said interior surface abutting said end wall and with said fixed latch mechanism in overlying relation with said end wall top edge latch receiver portions, said roof panels arranged upon sliding movement toward each other to engage said fixed latch member secured thereto to said end wall top edge latch receiver portions and to position said roof panel longitudinal frame portions in abutting relation with each other, said movable key actuated latch members associated with one of said roof panel longitudinal frame members operable upon actuation to engage said latch receiver portions of said other longitudinal frame member and secure said pair of roof panels to each other and form a unitary roof member, and said floor member having a plurality of floor panels with depending side and end portions forming a box configuration, said floor panels arranged to receive said end wall panels, said side wall panels and said roof panels in a dismantled condition.

7. A portable shelter as set forth in claim 6 in which both of said end walls include a plurality of end wall panels having vertical side edge portions, certain of said side edge portions having latch receiver portions formed therein, other of said side edge portions having movable key actuated latch members extending laterally therefrom, said end wall panels positioned with said side edge portions abutting each other with said key actuated latch members in overlying relation with said latch receiver portions, and said movable key actuated latch members arranged upon actuation to engage said latch receiver portions and secure said end wall panels to each other and form unitary end walls.

8. A portable shelter as set forth in claim 6 in which said key actuated latch member includes a latch mechanism having a depending lateral downturned portion and an upturned end portion, said latch member slidingly secured to said respective panel, said latch member downturned portion arranged to be moved beneath a lock portion in said adjacent latch receiver portion to thereby lock said movable latch mechanism in said receiver portion.

9. A portable shelter as set forth in claim 8 in which said respective panels include passageways extending substantially normal to said latch mechanism, said passageways arranged to receive a key member engageable with said latch mechanism downturned portion so that upon rotation of said key member said latch mechanism is moved beneath said lock portion of said adjacent latch receiver portion.

References Cited

UNITED STATES PATENTS

| | | | |
|---|---|---|---|
| 2,078,011 | 4/1937 | Neher | 52—262 X |
| 2,350,904 | 6/1944 | King | 52—93 X |
| 2,359,577 | 10/1944 | Patrick | 52—71 X |
| 2,647,287 | 8/1953 | Jones | 52—127 X |
| 2,703,912 | 3/1955 | Tinnerman | 287—20.924 |
| 2,766,488 | 10/1956 | Danielson | 52—584 X |

JOHN E. MURTAGH, *Primary Examiner.*